US012785155B2

(12) United States Patent
Ogihara et al.

(10) Patent No.: US 12,785,155 B2
(45) Date of Patent: Nov. 3, 2026

(54) METHOD FOR PRODUCING A LITHIUM ION BATTERY AND LITHIUM ION BATTERY

(71) Applicant: Bayerische Motoren Werke Aktiengesellschaft, Munich (DE)

(72) Inventors: Hideki Ogihara, Haimhausen (DE); Hyunchul Roh, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 590 days.

(21) Appl. No.: 18/276,088

(22) PCT Filed: Jan. 25, 2022

(86) PCT No.: PCT/EP2022/051554
§ 371 (c)(1),
(2) Date: Aug. 7, 2023

(87) PCT Pub. No.: WO2022/171425
PCT Pub. Date: Aug. 18, 2022

(65) Prior Publication Data

US 2024/0128522 A1 Apr. 18, 2024

(30) Foreign Application Priority Data

Feb. 11, 2021 (DE) ..................... 10 2021 103 172.9

(51) Int. Cl.
*H01M 10/42* (2006.01)
*H01M 10/0525* (2010.01)
(Continued)

(52) U.S. Cl.
CPC ... *H01M 10/4235* (2013.01); *H01M 10/0525* (2013.01); *H01M 10/0585* (2013.01); *H01M 10/44* (2013.01); *H01M 2200/20* (2013.01)

(58) Field of Classification Search
None
See application file for complete search history.

(56) References Cited

U.S. PATENT DOCUMENTS

2004/0045597 A1 3/2004 Kimijima et al.
2007/0026313 A1 2/2007 Sano
(Continued)

FOREIGN PATENT DOCUMENTS

CN 1701450 A 11/2005
CN 101438455 A 5/2009
(Continued)

OTHER PUBLICATIONS

International Search Report (PCT/ISA/210) issued in PCT Application No. PCT/EP2022/051554 dated Jul. 21, 2022 with English translation (4 pages).
(Continued)

*Primary Examiner* — Zhongqing Wei
(74) *Attorney, Agent, or Firm* — Crowell & Moring LLP

(57) ABSTRACT

A method for producing a lithium ion battery includes the following steps: A casing is provided and an electrode arrangement is inserted therein. The electrode arrangement is formed from alternating layers of a cathode and an anode, where at least one anode contains an anode active material comprising a silicon- and/or titanium-based constituent. At least one flexible volume compensation element is situated between the electrode arrangement and the casing. The volume compensation element comprises a shell and an inert gas or electrolyte accommodated within the shell. The volume compensation element counteracts expansion of the electrode arrangement. The casing is sealed to form the lithium ion battery. The lithium ion battery is then charged, and the shell of the volume compensation element is opened to release the inert gas or the electrolyte when a target
(Continued)

expansion of the electrode arrangement is reached. A lithium ion battery is also described.

19 Claims, 3 Drawing Sheets

(51) Int. Cl.

| | |
|---|---|
| ***H01M 10/0585*** | (2010.01) |
| ***H01M 10/44*** | (2006.01) |

(56) References Cited

U.S. PATENT DOCUMENTS

| | | | | |
|---|---|---|---|---|
| 2017/0194625 | A1 | 7/2017 | Woehrle et al. | |
| 2017/0279088 | A1 | 9/2017 | Reinshagen et al. | |
| 2020/0227794 | A1* | 7/2020 | Mazza .............. | H01M 10/6567 |

FOREIGN PATENT DOCUMENTS

| | | | | |
|---|---|---|---|---|
| CN | 106654354 | A | 5/2017 | |
| DE | 10 2011 015 830 | A1 | 10/2012 | |
| DE | 10 2013 215 552 | A1 | 2/2015 | |
| DE | 10 2014 201 836 | A1 | 8/2015 | |
| DE | 10 2014 217 425 | A1 | 3/2016 | |
| DE | 10 2018 204 220 | A1 | 9/2019 | |
| DE | 10 2018 212 450 | A1 | 1/2020 | |
| KR | 10-2006-0011242 | A | 2/2006 | |
| WO | WO-2012167812 | A1 * | 12/2012 | .......... H01M 50/249 |
| WO | WO-2015114074 | A1 * | 8/2015 | .......... H01M 50/429 |

OTHER PUBLICATIONS

German-language Written Opinion (PCT/ISA/237) issued in PCT Application No. PCT/EP2022/051554 dated Jul. 21, 2022 with English translation (8 pages).

German-language Search Report issued in German Application No. 10 2021 103 172.9 dated Jan. 13, 2022 with partial English translation (14 pages).

Chinese-language Office Action issued in Chinese Application No. 202280014204.3 dated Apr. 28, 2026, with English translation (19 pages).

* cited by examiner

METHOD FOR PRODUCING A LITHIUM ION BATTERY AND LITHIUM ION BATTERY

BACKGROUND AND SUMMARY

The invention relates to a method for producing a lithium-ion battery and also to a lithium-ion battery.

The term "lithium-ion battery" is used below synonymously for all customary prior-art designations for galvanic elements and cells that contain lithium, such as, for example, lithium battery, lithium cell, lithium-ion cell, lithium-polymer cell, and lithium-ion accumulator. The term embraces, in particular, rechargeable batteries (secondary batteries). In addition, the terms "battery" and "electrochemical cell" are utilized synonymously with the term "lithium-ion cell". The lithium-ion battery may also be a solid-state battery—for example, a ceramic or polymer-based solid-state battery.

Lithium-ion batteries have at least two different electrodes: a positive (cathode) and a negative (anode) electrode. Each of these electrodes comprises at least one active material. During the production process, the cathode and the anode are arranged one over another, in stacks, for example, to give an electrode arrangement, with a separator being used for electrical insulation between cathode and anode.

In lithium-ion batteries, both the anode and the cathode are capable of accepting and delivering lithium ions. The acceptance or delivery of the lithium ions may lead to a change in volume of the active material, with the extent of the change in volume being dependent on the particular active material. Anode active materials in particular, which are candidates for lithium-ion batteries with high energy densities, exhibit sharp changes in volume. Controlling this change in volume is especially important particularly during the first charging procedure when the SEI (solid electrolyte interface) is formed on the anode.

The changes in volume which occur may lead to the development of inhomogeneous regions in the anode and/or cathode, especially in a limiting region between the respective anode or cathode and an adjacent separator. For example, cavities may form, in which gases that arise may accumulate.

Such inhomogeneities may lead to, or exacerbate, the incidence of unwanted processes which have adverse consequences for the performance capability and/or the lifetime of the lithium-ion battery, examples being "lithium plating" or secondary reactions with the electrolyte.

In order to reduce the extent of inhomogeneities that occur during charging procedures, owing to changes in volume, or to rule them out entirely, it is possible to exert pressure on the electrode arrangement.

Where the lithium-ion battery has a flexible casing, for example, as used in what are called "pouch cells," it is possible to exert pressure on the casing by means of a tightening apparatus or stencil that is designed to match the size of the casing. As a result, however, there may be instances of deformation and/or damage to the casing and/or to the lithium-ion battery. Moreover, this technique is not suitable for lithium-ion batteries having rigid casings, such as prismatic casings.

A further means of limiting the change in volume is to use buffer materials within the anode and/or cathode, as these materials may exhibit a reduced change in volume or none. This, however, reduces the attainable energy density of the lithium-ion battery.

The object of this disclosure is to provide a lithium-ion battery which has a high energy density and a long lifetime.

A further object of the disclosure is to specify a method for producing a lithium-ion battery of this kind.

The object may be achieved by a method for producing a lithium-ion battery, comprising steps as follows: a casing is provided and an electrode arrangement is introduced into the casing. The electrode arrangement is composed of alternating layers of a cathode and an anode, where the at least one anode comprises an anode active material which comprises a silicon- and/or titanium-based constituent. Arranged between the electrode arrangement and the casing is at least one flexible volume compensation element, where the volume compensation element comprises a shell and an inert gas accommodated within the shell or an electrolyte accommodated within the shell, and where the volume compensation element counteracts expansion of the electrode arrangement. The casing is sealed to form the lithium-ion battery. The lithium-ion battery is subsequently charged. On attainment of a target expansion of the electrode arrangement during charging, the shell of the volume compensation element is opened, releasing the inert gas or the electrolyte.

In accordance with the disclosure, the volume compensation element may serve to prevent the occurrence of inhomogeneities within the electrode arrangement, by virtue of the volume compensation element exerting a force acting on the electrode arrangement in the event of an increase in volume of the electrode arrangement.

In other words, the volume compensation element exerts pressure on the electrode arrangement as soon as the latter increases in volume during a charging procedure, as is to be expected because of the silicon- and/or titanium-based constituent. The magnitude of the acting force is determined substantially by the compressibility of the electrolyte or inert gas present within the shell of the volume compensation element.

At the same time, however, the force exerted by the volume compensation element is not so great as to entirely inhibit expansion of the electrode arrangement. In accordance with this disclosure, therefore, the electrode arrangement is able to expand in a controlled way until the electrode arrangement has attained a target expansion.

The target expansion corresponds in particular to an anticipated maximum expansion of the electrode arrangement. This means that, over the lifetime of the lithium-ion battery as well, there is no anticipated expansion on the part of the electrode arrangement used that is greater than the target expansion, apart from unavoidable minor fluctuations. After the target expansion has been attained for the first time, therefore, there is no longer any likelihood of inhomogeneities occurring to a substantial extent.

Once the electrode arrangement reaches its target expansion, in accordance with this disclosure, the shell of the volume compensation element is opened and the inert gas or electrolyte present is released. In this way, the resulting size and position of the opened volume compensation element and also of the electrode arrangement is known after the associated charging procedure with the lithium-ion battery, in order to ensure optimal cell design of the lithium-ion battery.

The volume compensation element is arranged more particularly in a dead volume of the casing. The dead volume denotes a region within the casing in which otherwise only gaseous components are provided. Such dead volumes are already present in known versions of lithium-ion batteries, and so there is no need for any costly and inconvenient adaptation in the production process in order to be able to implement the method of this disclosure.

The silicon- and/or titanium-based constituent of the anode active material is more particularly an active material with sharp change in volume on the intercalation and deintercalation of lithium. Correspondingly, the silicon- and/or titanium-based constituent is the determining constituent of the change in volume of the anode active material, and hence of the anode and also of the electrode arrangement, that occurs during the charging/discharging procedure.

The term "sharp change in volume" here represents more particularly a change in volume on the intercalation/deintercalation of lithium that is greater than the change in volume of graphite on the intercalation/deintercalation of lithium.

In particular, an anode active material exhibits a sharp change in volume if on accommodation of 50% of the maximum reversibly intercalatable molar amount of lithium, the volume of the anode active material increases at least by 10%, as for example by at least 50%, and on delivery of 50% of the maximum reversibly accommodatable molar amount of lithium, reduces at least by 10%, as for example at least by 50%, based in each case on the volume before accommodation or release of lithium, respectively.

The silicon- and/or titanium-based constituent may be selected from the group consisting of silicon, silicon suboxide, silicon-carbon composite, silicon alloys, titanium, titanium oxide, titanium-carbon composite, and combinations thereof.

Active materials of these kinds are notable for particularly high energy densities. However, these active materials exhibit sharp changes in volume during the charging/discharging procedure. The method of this disclosure makes it possible to exploit the high energy densities of these active materials without their sharp changes in volume adversely affecting the stability of the electrode arrangement and the lifetime of the lithium-ion battery.

The silicon- and/or titanium-based constituent is present in particular in a fraction of 0.5 to 99 wt. %, preferably of 3 to 98 wt. %, based on the total weight of the anode.

The inert gas may be selected from the group consisting of carbon dioxide, nitrogen, noble gases, and a combination thereof. Suitable noble gases are especially argon, neon or xenon, preferably argon. Critical factors in the selection of the inert gas are the compatibility with the further constituents of the lithium-ion battery and also the costs of the inert gas.

The electrolyte within the shell of the volume compensation element is an electrolyte which is chemically compatible with the further constituents of the lithium-ion battery. The electrolyte is preferably the same as is already employed in the lithium-ion battery.

The electrolyte is conducting for lithium ions and may be a liquid which comprises a solvent and at least one conductive lithium salt dissolved therein.

The solvent is preferably inert. Suitable solvents are, for example, organic solvents such as ethylene carbonate (EC), propylene carbonate (PC), butylene carbonate, dimethyl carbonate (DMC), diethyl carbonate (DEC), ethyl methyl carbonate (EMC), sulfolane, 2-methyltetrahydrofuran, and 1,3-dioxiolane.

Ionic liquids may also be used as solvents. Such ionic liquids contain exclusively ions. Preferred cations, which in particular may be alkylated, are imidazolium, pyridinium, pyrrolidinium, guanidinium, uronium, thiuronium, piperidinium, morpholinium, sulfonium, ammonium, and phosphonium cations. Examples of anions which can be used are halide, tetrafluoroborate, trifluoroacetate, tieflate, hexafluorophosphate, phosphinate, and tosylate anions.

Illustrative ionic liquids include the following: N-methyl-N-propylpiperidinium bis(trifluoromethylsulfonyl)imide, N-methyl-N-butylpyrrolydinium bis(trifluoromethylsulfonyl)imide, N-butyl-N-trimethylammonium bis(trifluoromethylsulfonyl)imide, triethylsulfonium bis(trifluoromethylsulfonyl)imide, and N,N-diethyl-N-methyl-N-(2-methoxyethyl)ammonium bis(trifluoromethylsulfonyl)imide.

In one variant, two or more of the above-stated liquids may be used.

Preferred conductive lithium salts are lithium salts which have inert anions and which are preferably nontoxic. Suitable lithium salts are, in particular, lithium hexafluorophosphate ($LiPF_6$), lithium tetrafluoroborate ($LiBF_4$), lithium bis(fluorosulfonyl)imide (LIFSi), and mixtures of these salts.

The shell of the volume compensation element may be composed of any desired material which is compatible with the further constituents of the lithium-ion battery and also with the electrolyte or inert gas that is accommodated within the shell.

The shell is preferably composed of an electrically insulating material. In this way, the volume compensation element is able to provide electrical insulation between electrode arrangement and casing. In that case, there is no need to provide any additional insulating layer on the shell-facing inside of the casing.

For example, the shell may be composed of a polymer, as for example of polyethylene (PE), polypropylene (PP), polyethylene terephthalate (PET), combinations and/or copolymers thereof.

The shell is preferably opened on first-time charging of the lithium-ion battery. The first-time charging is also referred to as a "pre-charge" step or as formation. In this step, a particularly high increase in volume of the electrode arrangement is expected, and the SEI is formed. For the resulting performance capability and also lifetime of the lithium-ion battery, therefore, it is especially important to prevent the occurrence of inhomogeneities, as is made possible by the volume compensation element.

In order to prevent an overpressure forming within the casing as a result of the release of the inert gas from the shell of the volume compensation element, the inert gas released from the volume compensation element may be removed in a degassing step.

Especially in the event of the shell having already been opened during the first charging procedure with the lithium-ion battery, the inert gas released from the volume compensation element may be removed without additional cost and complexity by also utilizing the degassing step after the first charging and discharging procedure, as provided in known production processes, for removing the inert gas released.

In one variant, the shell is opened on attainment of a limiting pressure in the interior of the shell. The limiting pressure corresponds to the target expansion of the electrode arrangement and is determined in particular by way of the material and also the thickness of the shell, with a thinner shell resulting, in particular, in a lower limiting pressure.

In order to open the shell more reliably, the shell of the volume compensation element may be deformed during the charging of the lithium-ion battery, with the shell, as a result of the deformation, coming into contact with an opening element which opens the shell.

The opening element may be any desired element which reliably opens the volume compensation element on interaction with the shell of said element.

For example, the opening element is a nail, a projection or an edge within the casing.

The opening element is arranged in an expansion region of the casing, the expansion region being a region within the casing in which the volume compensation element is not arranged before the charging of the lithium-ion battery, and into which the volume compensation element passes through deformation on the charging of the lithium-ion battery.

In principle, a plurality of opening elements may be provided. Where two or more volume compensation elements are used, in particular at least one assigned opening element is provided for each volume compensation element.

Additionally, the shell may be opened in a weakening zone of the shell.

The weakening zone may be a mechanically less resistant subregion of the shell. In the weakening zone, for example, the shell has a lower thickness and/or a notch.

In order to open the shell reliably, the weakening zone in particular interacts with the opening element on the charging of the lithium-ion battery.

The weakening zone may be a subregion of the shell that is more temperature-sensitive than the remainder of the shell.

A configuration of this kind may be especially advantageous if the target expansion of the electrode arrangement is attained only in the course of the lifetime of the lithium-ion battery, and not within the first charging cycles. In other words, the target expansion may be attained only through ageing effects. As a result of ageing effects, a higher operating temperature of the electrode arrangement on charging of the lithium-ion battery can be anticipated, and may ultimately result in the opening of the shell in the weakening zone.

The object of the disclosure may further achieved by a lithium-ion battery produced according to the method described above.

The lithium-ion battery of the disclosure is more particularly a lithium-ion battery for use in a high-voltage storage system for a vehicle.

Further features and advantages of the invention are apparent from the description below of illustrative embodiments, which are not to be understood in a limiting sense.

BRIEF DESCRIPTION OF THE DRAWINGS

In the figures.

DETAILED DESCRIPTION OF THE DRAWINGS

Figure 1:
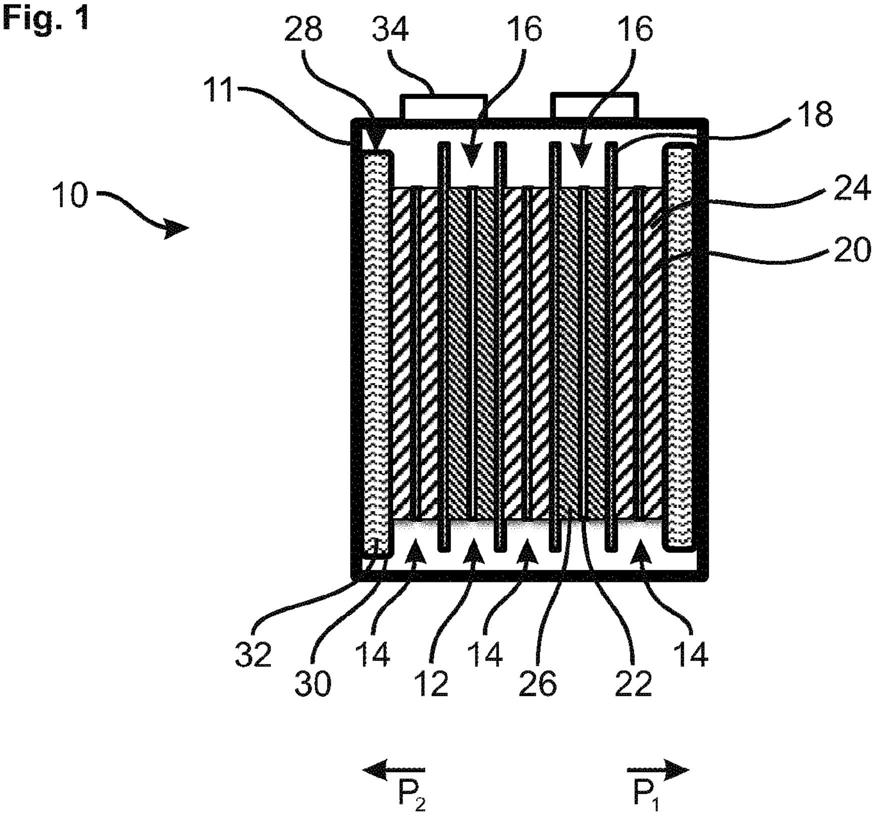
FIG. 1 shows a schematic representation of a first embodiment of the lithium-ion battery of the disclosure, before the opening of a volume compensation element.

Represented schematically in FIG. 1 is a lithium-ion battery 10 according to an exemplary embodiment.

The lithium-ion battery 10 comprises a casing 11, made of aluminum and/or stainless steel, for example, and also an electrode arrangement 12 arranged within the casing 11.

The electrode arrangement 12 comprises anodes 14 and also cathodes 16. The anodes 14 and the cathodes 16 are arranged in alternation in an electrode stack, with a separator 18 being arranged between each anode 14 and cathode 16.

Each of the anodes 14 has an anode carrier foil 20, which in the variant represented is a copper foil, and each of the cathodes 16 has a cathode carrier foil 22, which in the variant represented is an aluminum foil.

The anodes 14, on both sides of the respective anode carrier foil 20, have an anode film 24, and the cathodes 16, on both sides of the respective cathode carrier foil 22, have a cathode film 26.

The cathode films 26 of the cathodes may comprise any desired cathode active material of the kind which are known in the prior art. This includes, for example, $LiCoO_2$, lithium nickel cobalt manganese compounds (known under the abbreviation NCM or NMC), lithium nickel cobalt aluminum oxide (NCA), lithium iron phosphate, other olivine compounds, and lithium manganese oxide spinel (LMO). Over-lithiated layer oxides (OLO) may also be used. The cathode active material may also comprise mixtures of two or more of the stated lithium-containing compounds.

The anode films 24 of the anodes 14 comprise an anode active material which comprises a silicon- and/or titanium-based constituent, which more particularly is selected from the group consisting of silicon, silicon suboxide, silicon-carbon composite, silicon alloys, titanium, titanium oxide, titanium-carbon composite, and combinations thereof.

The number of anodes 14 and cathodes 16 may in principle depart from the number present in the embodiment shown.

In the embodiment represented, the electrode arrangement has anodes 14 at each of its respective ends along the sequence of anodes 14 and cathodes 16. In principle, however, it would also be possible for there to be cathodes 16 at the respective ends, or an anode 14 at one end and a cathode 16 at the opposite end.

It is preferred, however, for two anodes 14 to form the respective ends of the electrode arrangement 12, since electrode arrangements 12 of this kind are easier to produce, and thus the production rate may be boosted.

It is preferred, furthermore, to use more anodes 14 than cathodes 16 in the electrode arrangement 12, since the costs of each anode 14, owing to the anode active materials used, are typically lower than for each of the cathodes 16 with known cathode active materials.

Disposed between the electrode arrangement 12 and the casing 11 at both ends of the electrode arrangement 12 is a respective flexible volume compensation element 28.

The volume compensation element 28 comprises a shell 30 and an inert gas 32 accommodated within the shell 30.

The shell 30 is composed of an electrically insulating material, a plastic for example, and so the electrode arrangement 12 is electrically insulated from the casing 11.

The inert gas 32 may be selected from the group consisting of carbon dioxide, nitrogen, noble gases, and a combination thereof. Suitable noble gases are, in particular, argon, neon or xenon, preferably argon.

In principle there may also be an electrolyte (not illustrated) present within the shell 30, instead of the inert gas 32.

The lithium-ion battery 10 further possesses electrical contacts 34, which are electrically connected via collectors (not illustrated) to the electrode arrangement 12 and which serve for the electrical contacting of the lithium-ion battery.

Explained in more detail below is the functioning of the lithium-ion battery 10 of the disclosure, especially of the volume compensation element 28.

As described above, the anodes 14, specifically the anode films 24, comprise an anode active material which may comprise a silicon- and/or titanium-based constituent.

As a result of the silicon- and/or titanium-based constituent, the anode active material of the anode films 24 of the anodes 14, and consequently the entire electrode arrangement 12, may exhibit a sharp change in volume on intercalation and deintercalation of lithium ions, in other words, during charging and discharging procedures with the lithium-ion battery 10.

The change in volume takes place substantially in the expansion directions indicated by the arrows $P_1$ and $P_2$ in FIG. 1, in other words, in the direction of the volume compensation elements 28 and of those portions of the casing that are in contact with the volume compensation elements 28.

By virtue of the inert gas 32 accommodated within the shell 30, the volume compensation elements 28 have a limited compressibility, and thus, on expansion of the electrode arrangement 12, the volume compensation elements 28 may act on the electrode arrangement 12 with a force which is substantially contrary to the respective expansion direction $P_1$ or $P_2$.

As a result of this contrary force, a uniform pressure may be exerted on the anodes 14, specifically on the anode films 24, that may prevent or at least reduce the formation of inhomogeneities owing to the change in volume within the anodes 14.

However, the force exerted by the volume compensation elements 28 is not so great as to completely prevent expansion of the electrode arrangement. Instead, on increasing volume expansion of the electrode arrangement 12, the flexible volume compensation element 28 is deformed.

When the electrode arrangement 12 attains a predetermined target expansion, the shell 30 of the volume compensation element 28 is opened. For example, the shell bursts or tears open. In particular, a limiting pressure is generated inside the shell 30 and leads to the opening of the shell 30.

In this way, the inert gas 32 is delivered to the interior of the casing 11.

Figure 2:
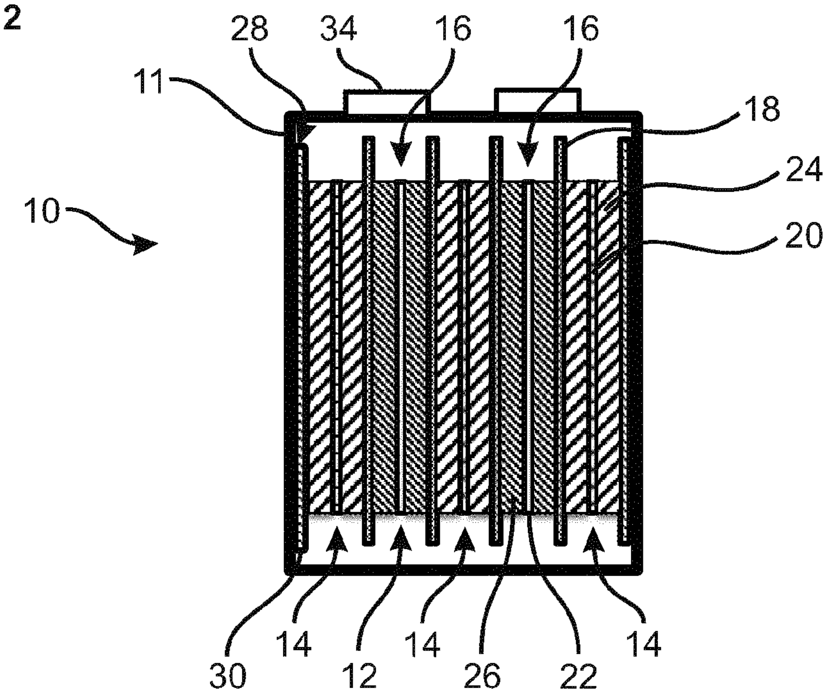
FIG. 2 shows a schematic representation of the lithium-ion battery of the disclosure according to FIG. 1, after the opening of the volume compensation element.

The resulting state of the lithium-ion battery 10 is represented schematically in FIG. 2.

As can be seen in FIG. 2, the opened shell 30 remains as electrical insulation between electrode arrangement 12 and casing 11.

The lithium-ion battery of the disclosure may have no inhomogeneities, or at least reduced inhomogeneities, within the electrode arrangement 12, although a sharply volume-changing anode active material is employed. This therefore results in a performance-capable lithium-ion battery having a long lifetime.

Figure 3:
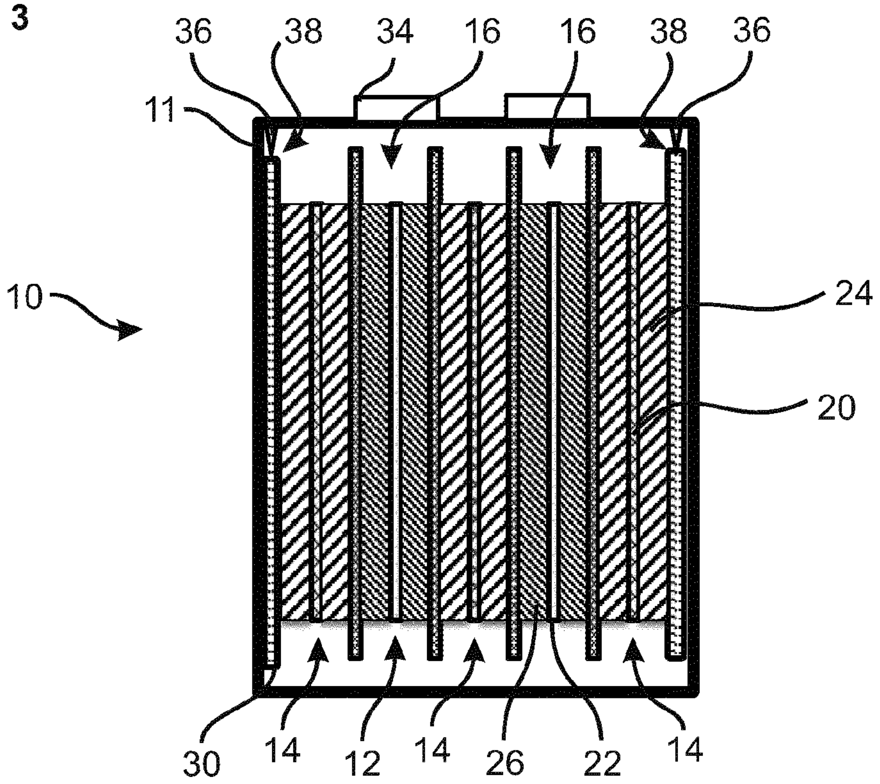
FIG. 3 shows a second embodiment of the lithium-ion battery of the disclosure.

Represented in FIG. 3 is a second embodiment of the lithium-ion battery 10.

The second embodiment corresponds to substantially the first embodiment, and so only differences are addressed below. Components which are the same or have the same effect are provided with the same reference signs.

In the second embodiment, the lithium-ion battery 10 possesses two opening elements 36, which in the embodiment shown are configured in the form of a nail.

In principle, however, alternative configurations of the opening elements 36 are also suitable—for example, projections or edges may be provided as the opening elements 36.

The opening elements 36 are arranged in the interior of the casing 11 and extend in each case into an expansion region 38, in which the flexible volume compensation element 28 expands, as soon as it is deformed by the change in volume of the electrode arrangement 12.

Each of the volume compensation elements 28 is assigned to an opening element 36, and on attainment of the target expansion of the electrode arrangement 12, is opened by interaction with the respectively assigned opening element 36.

In the embodiment shown, the nail punctures the shell 30 of the volume compensation element 28.

Figure 4:
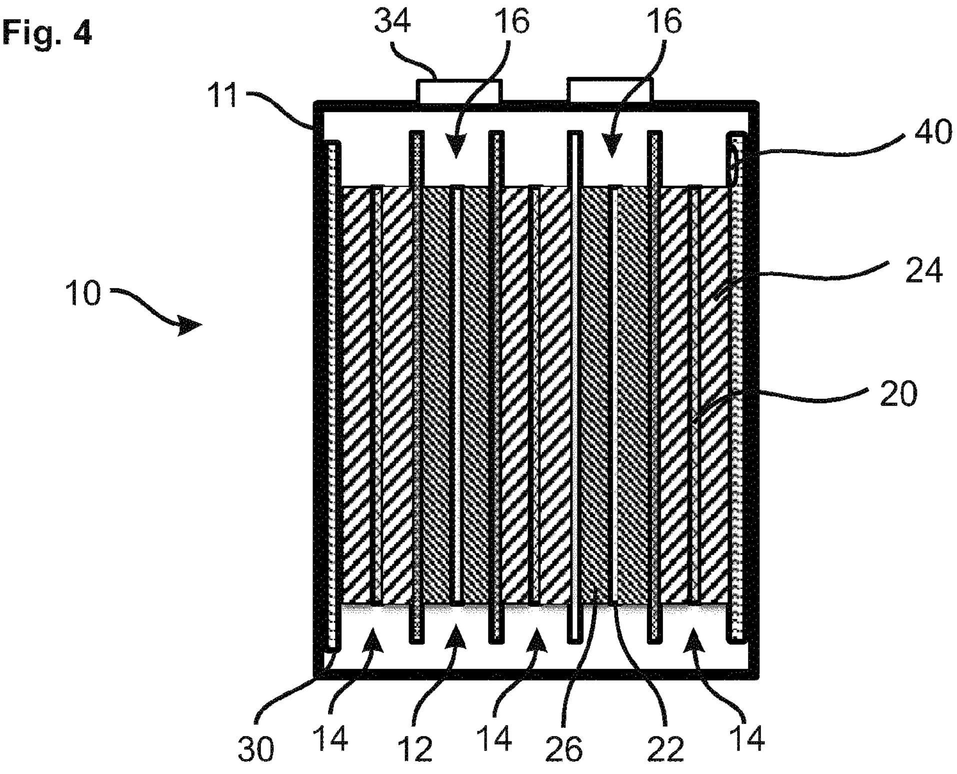
FIG. 4 shows a third embodiment of the lithium-ion battery of the disclosure.

Represented in FIG. 4 is a third embodiment of the lithium-ion battery 10.

The third embodiment corresponds substantially to the first and second embodiments, and so only differences are addressed below. Components which are the same or have the same effect are provided with the same reference sign.

In the third embodiment, the volume compensation element 28 has a weakening zone 40.

In the weakening zone 40, the shell 30 of the volume compensation element 28 has a lower wall strength. In other words, the weakening zone 40 is a predetermined breakage point at which the shell 30 is preferentially opened.

From the embodiments shown it is also self-evident that any desired combination of volume compensation elements 28 and mechanisms for opening the shell 30 may be used. For example, one of the volume compensation elements 28 may be opened by attainment of the limiting pressure, and another of the volume compensation elements 28 by interaction with an opening element 36.

Described below is a method for producing the lithium-ion battery 10 of this disclosure.

Figure 5:
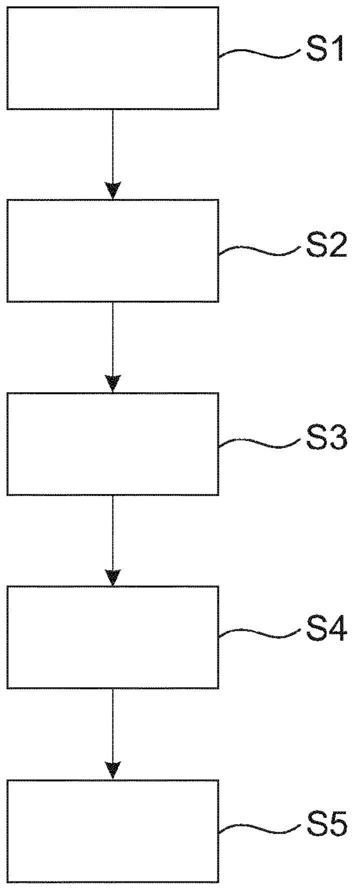
FIG. 5 shows a block diagram of a method for producing the lithium-ion batteries according to FIGS. 1 to 4.

First of all, the casing 11 is provided (step S1 in FIG. 5).

Subsequently, the electrode arrangement 12 described above is introduced into the casing 11 (step S2 in FIG. 5).

The above-described volume compensation elements 28 are arranged between the electrode arrangement 12 and the casing 11 (step S3 in FIG. 5), and the casing 11 is sealed to form the lithium-ion battery 10 (step S4 in FIG. 5).

Finally, the lithium-ion battery 10 is charged, and on attainment of the target expansion of the electrode arrangement 12, the shell 30 of the volume compensation element 28 is opened, with release of the inert gas 32 or of the electrolyte (not illustrated) (step S5 in FIG. 5).

After the method steps S1 to S4 (cf. FIG. 5), by means of the method of the disclosure, a lithium-ion battery 10 has already been produced, as represented in FIG. 1, meaning that as yet the shell 30 of the volume compensation element 28 is not open.

In principle, the lithium-ion battery 10 can be used even at this point in time, with the shell not being opened until a later point in time, during an arbitrary charging procedure with the lithium-ion battery 10.

Preferably, however, the shell is opened as early as during a charging procedure carried out within the production process for the lithium-ion battery 10—for example, in the pre-charge step/during formation.

In this way, the electrode arrangement 12 attains its target expansion during production itself, and not only in the later operation of the lithium-ion battery 10.

In particular, the inert gas released from the shell 30 may be removed before the operation of the lithium-ion battery 10, in an optional degassing step.

The invention claimed is:

1. A method for producing and operating a lithium-ion battery, the method comprising:

providing a casing;

introducing an electrode arrangement into the casing, the electrode arrangement including alternating layers of a cathode and an anode, and where at least one layer of the anode comprises an anode active material including a silicon- and/or titanium-based constituent;

arranging at least one flexible volume compensation element between the electrode arrangement and the casing, the volume compensation element comprising a shell and an inert gas or an electrolyte accommodated within the shell, the volume compensation element being configured to counteract expansion of the electrode arrangement;

sealing the casing to form the lithium-ion battery; and charging the lithium-ion battery, wherein, on attainment of a target expansion of the electrode arrangement during charging, the shell of the volume compensation element is opened, releasing the inert gas or the electrolyte.

2. The method according to claim 1, wherein the silicon- and/or titanium-based constituent is selected from the group consisting of silicon, silicon suboxide, silicon-carbon composite, silicon alloys, titanium, titanium oxide, titanium-carbon composite, titanates, and combinations thereof.

3. The method according to claim 2, wherein the silicon- and/or titanium-based constituent is a determining constituent in a change in volume of the anode active material and hence in expansion of the anode and the electrode arrangement during charging.

4. The method according to claim 2, wherein the silicon- and/or titanium-based constituent is present at a fraction of 0.5 to 99 wt. % based on the total weight of the anode active material.

5. The method according to claim 1, wherein the shell comprises an electrically insulating material.

6. The method according to claim 1, wherein the shell comprises a polymer selected from the group consisting of polyethylene (PE), polypropylene (PP), polyethylene terephthalate (PET), and combinations thereof.

7. The method according to claim 1, wherein the shell is opened during a first-time charging of the lithium-ion battery.

8. The method according to claim 1, wherein the inert gas released from the volume compensation element is removed in a degassing step.

9. The method according to claim 1, wherein the inert gas is selected from the group consisting of carbon dioxide, nitrogen, argon, neon, xenon, and a combination thereof.

10. The method according to claim 1, wherein the electrolyte includes a solvent and at least one lithium ion conductive salt dissolved therein.

11. The method according to claim 1, wherein the shell is opened on attainment of a limiting pressure in an interior of the shell.

12. The method according to claim 1, wherein the shell of the at least one flexible volume compensation element is deformed during the charging of the lithium-ion battery, thereby coming into contact with an opening element which opens the shell.

13. The method according to claim 12, wherein the opening element comprises a nail, a projection, or an edge within the casing.

14. The method according to claim 1, wherein the shell comprises a weakening zone, and the shell is opened in the weakening zone.

15. The method according to claim 14, wherein the weakening zone comprises a subregion of the shell having a lower mechanical resistance or an increased temperature sensitivity than a remainder of the shell.

16. The method according to claim 1, wherein, as the electrode arrangement expands in volume during charging, the at least one flexible volume compensation element exerts pressure on the electrode arrangement, thereby counteracting the expansion, and a magnitude of the pressure is determined substantially by a compressibility of the inert gas or the electrolyte accommodated within the shell.

17. The method according to claim 16, wherein the pressure exerted by the at least one flexible volume compensation element serves to prevent an occurrence of inhomogeneities within the electrode arrangement.

18. The method according to claim 1, wherein the at least one flexible volume compensation element is arranged between the electrode arrangement and the casing at both ends of the electrode arrangement, the casing thereby containing two flexible volume compensation elements.

19. A lithium-ion battery produced by the method according to claim 1.

* * * * *